June 4, 1957

H. A. MACKIE 2,794,511

HOOD LINKAGE AND LATCH MECHANISM

Filed June 29, 1954

INVENTOR.
HARRY A. MACKIE
BY Brown, Jackson,
Boettcher & Dienner
ATTY.S

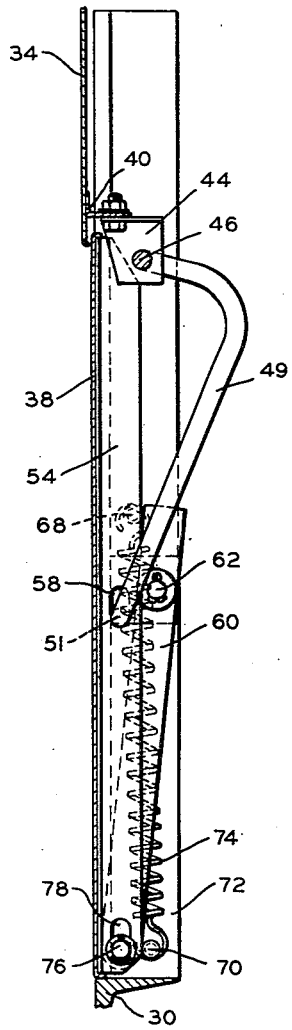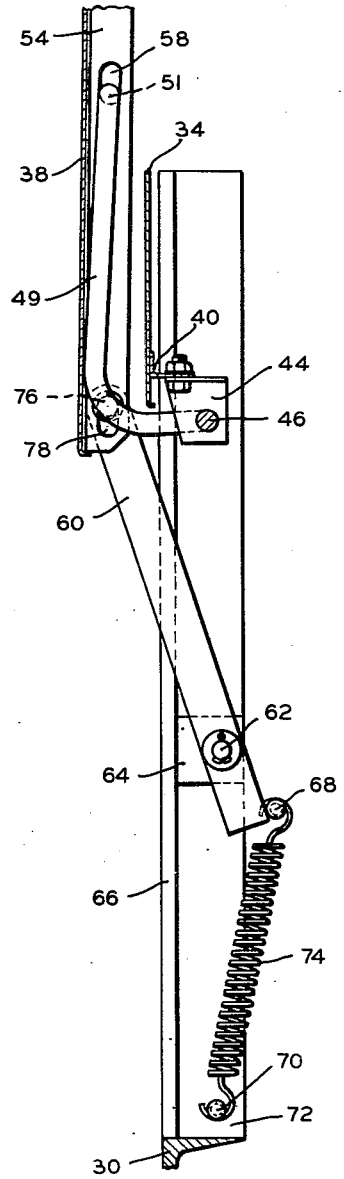

United States Patent Office 2,794,511
Patented June 4, 1957

2,794,511
HOOD LINKAGE AND LATCH MECHANISM

Harry A. Mackie, Bloomfield Hills, Mich., assignor to Clark Equipment Company, a corporation of Michigan Application June 29, 1954, Serial No. 439,968

6 Claims. (Cl. 180—69)

My present invention relates to hood linkage and latch mechanism for use with the side hood panels of commercial vehicles.

So that access may be had to the prime mover means enclosed by the hood of a commercial vehicle, detachable side hood panels are conventionally provided. When the prime mover means is to be inspected, serviced or repaired, one or both of the side hood panels are removed from the vehicle. This arrangement is unsatisfactory because the steps of removal are not only time consuming but the panels when improperly stored after removal are subject to damage.

It is an object of my present invention to provide a commercial vehicle with hood means comprising a side hood panel which while remaining attached to the vehicle may be moved from a closed position to an open position permitting access to be had to the area normally enclosed by the panel. By adopting the principles of my invention, the side hood panel does not have to be removed from the vehicle and stored when the prime mover means under the hood is to be worked upon.

It is a further object of my present invention to provide in association with the side hood panel of a commercial vehicle new and novel hood linkage mechanism which will facilitate movement of the panel from a closed to an open position. The hood linkage mechanism serves to maintain the lower edge of the side hood panel in a horizontal plane when the panel is in its lowermost and elevated positions.

It is another object of my present invention to provide hood linkage mechanism as noted which is adapted to maintain a substantially planar side hood panel parallel to the vertical median plane of the vehicle when the panel is in its open position. By maintaining the panel parallel to the vertical median plane of the vehicle when it is in an open position, the vehicle may be operated with the hood panel open, as frontal visual interference is absent.

It is still another object of my present invention to provide in association with the afore-described linkage mechanism, means for latching the hood panel securely to the side of the vehicle in a closed position.

In order to acquaint those skilled in the art with the manner of constructing and using hood linkage and latch mechanism in accordance with the principles of my present invention, I shall describe in connection with the accompanying drawings, a preferred embodiment of my invention.

In the drawings:

Figure 3 is a vertical sectional view taken along the line 3—3 in Figure 2, looking in the direction indicated by the arrows, and shows the side hood panel in closed position; and Figure 4 is a vertical sectional view corresponding to the view of Figure 3 but shows the side hood panel in an elevated position.

Figure 1:
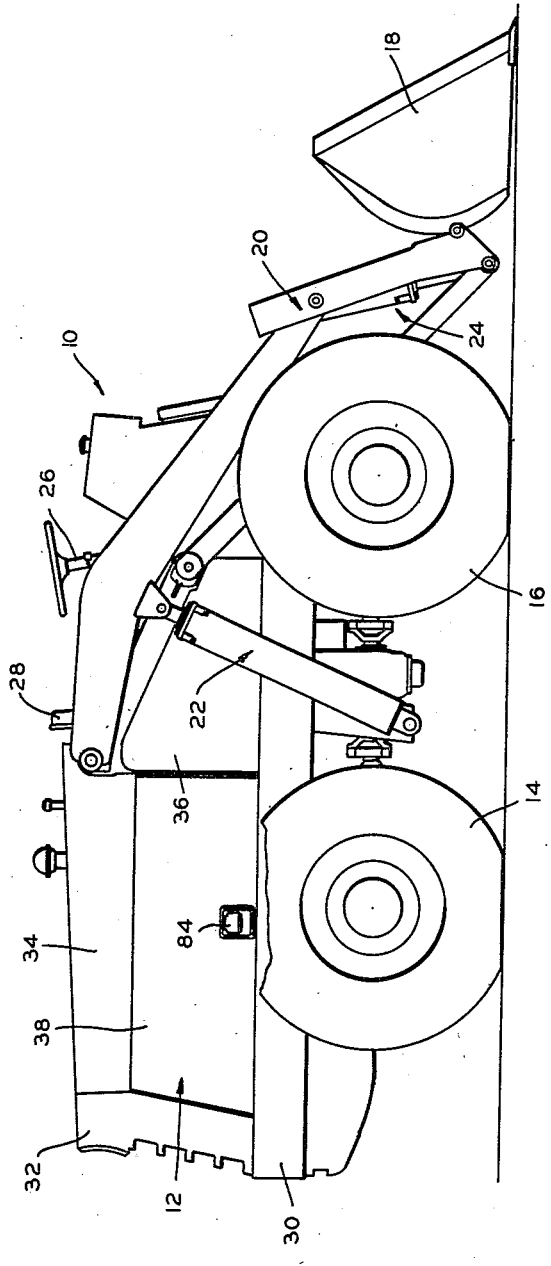
Figure 1 is a side elevational view of an industrial vehicle with which the hood supporting and latch mechanism of my present invention is embodied.

Referring now to the drawings, there is indicated generally by the reference numeral 10 a commercial or industrial vehicle which, by way of exemplification and not limitation, is shown as a tractor shovel vehicle. The vehicle 10 comprises a body 12 which is supported, at its rear end, on wheels 14, and, at its forward end, on wheels 16. A shovel or scoop member 18 is arranged at the forward end of the vehicle and is carried by linkage means 20 which is pivotally mounted to the body 12. The linkage means 20 is adapted to be pivoted relative to the vehicle by means of hydraulic piston and cylinder assembly means 22, while the shovel 18 is adapted to be pivoted relative to the linkage means 20 by means of hydraulic piston and cylinder assembly means 24. The vehicle is further provided with prime mover means (not shown), a steering assembly 26, and an operator's seat 28. A more detailed description of the afore-noted elements, other than the body 12, is believed to be unnecessary for purposes of the present disclosure, since they do not form any part of the present invention.

The body 12 comprises longitudinally extending, laterally spaced, side frame members 30. The frame members 30 are interconnected by conventional transverse frame members (not shown), and support the vehicle prime mover means, rearwardly of the operator's seat 28. The body 12 further includes a rear radiator assembly 32, a forwardly extending upper hood portion 34, and forward side body panels 36, the latter of which are affixed along their lower edges to the side frame members 30. The afore-described members serve to define an opening in the side of the vehicle body.

The upper hood portion 34 extends downwardly along its sides, as shown in Figure 1, and substantially vertically movable, planar, side hood panels 38 are employed on each side of the vehicle to close the area bounded by the adjacent portions of the side frame member 30, radiator assembly 32, upper hood 34, and side body panel 36. The longitudinal side edges of the upper hood portion 34, as shown in Figure 3, overlap the side hood panels 38, when the latter are in closed positions. My present invention is concerned with mechanisms for facilitating the raising and lowering of the side hood panels 38 and for latching the latter in closed positions. Since the mechanisms of my present invention, which are mounted on each side of the vehicle, are identical, except that the elements thereof are mounted in opposed relation, I shall describe in detail the mechanism on only one side of the vehicle.

Figure 2:
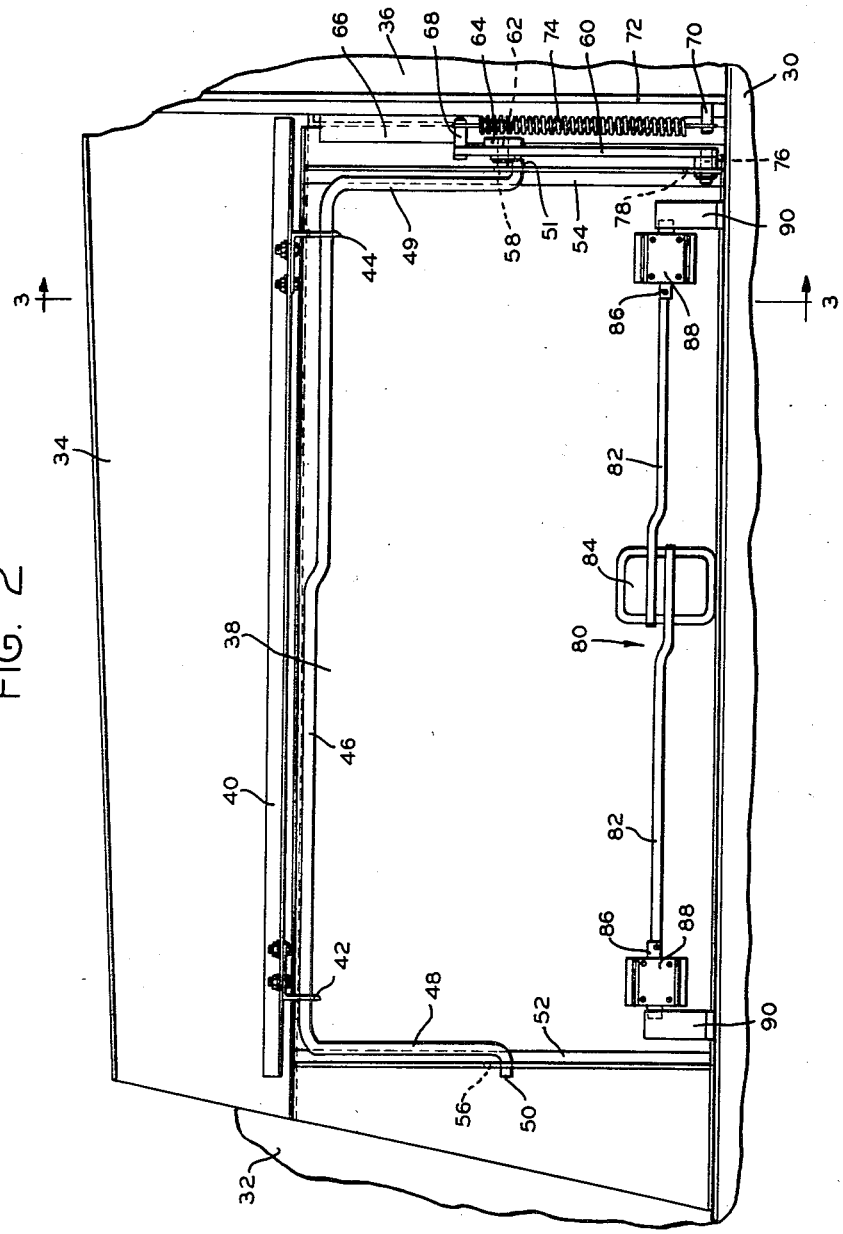
Figure 2 is an enlarged inside view of one side of the vehicle of Figure 1 and shows in detail the hood supporting and latch mechanism of my present invention.

Referring now to Figures 2, 3 and 4, it will be observed that a horizontal angle flange member 40 is secured to the inside of the downwardly projecting side of the upper hood 34, and, in turn, supports a pair of longitudinally spaced bracket members 42 and 44. Vertically offset horizontal openings are formed in the brackets 42 and 44 and extending therethrough is the body portion of a side hood panel supporting bar means 46. The body portion of the bar means 46 is formed at its ends with generally L-shaped arm portions 48 and 49, of dissimilar length, that lie in parallel planes substantially normal to the axis of the body portion. The ends of the arm portions 48 and 49 are respectively formed with out-turned finger portions 50 and 51, the axes of which are substantially normal to the planes of the arm portions 48 and 49. The bar means 46 is preferably fabricated from bar stock of circular cross-section.

A pair of vertical angle flange members or struts 52 and 54 are secured to the inside of the side hood panel 38, spaced a short distance from the ends thereof. The members 52 and 54 have formed intermediate of their ends vertical slots 56 and 58 that are adapted, respectively, to slidably receive the finger portions 50 and 51 of the bar means 46. The slots 56 and 58 are on center with each other and are the same length. In order to maintain alignment of the side hood panel 38 relative to the associated supporting mechanism during raising and lowering of the panel, as will be explained in detail hereinfter, the axis of the opening in the bracket 44 is offset downwardly from the axis of the opening in the bracket 42 a distance equal to one-half of the length of the slots 56 and 58. Likewise, the arm portion 49 of the bar means 46 is made shorter than the arm portion 48 by an amount equal to one-half of the length of the slots 56 and 58. With this arrangement, when the bar means 46 extends downwardly, as shown in Figures 2 and 3, the axes of the finger portions 50 and 51 are aligned and when the bar means extends upwardly, as shown in Figure 4, the axes of the finger portions are offset.

At the right side of the panel 38, as viewed in Figure 2, a lever 60, swingable in a vertical plane, is pivotally mounted intermediate of its ends on a horizontal pin member 62 which is carried by a bracket member 64 supported by a vertical brace member 66. The brace member 66 is secured, at its lower end, to the side frame member 30 and forms part of the fixed portion of the vehicle body. Horizontal mounting studs 68 and 70 project in opposite directions and are secured respectively in the one end of the lever 60 and in a vertical brace member 72 which is affixed, at its lower end, to the side frame member 30 and forms part of the fixed portion of the vehicle body. The ends of a counterbalance coil spring 74 are secured to the mounting studs 68 and 70.

As the panel 38 is moved to a closed position, the axis of the spring 74 passes through the plane of the axes of the pin member 62 and stud 70 causing the axis of the spring 74 to move "over-center" whereupon a closing force is imposed on the panel 38. The end of the lever 60, opposite the stud 68, carries a pin 76 which is slidably mounted within a vertical slot 78 formed in the lower end of the strut or angle flange member 54. The slot 78 is of the same length as the slots 56 and 58 in the vertical angle flange members 52 and 54.

Latch means indicated generally at 80 is provided for locking or latching the panel 38 in a closed position. The latch means 80 includes a pair of slidable latch bars 82 which, intermediate of the panel, have connection through cam means (not shown in detail) with a flush mount type handle 84. The outer ends of the latch bars 82 are pivotally connected to the one ends of latch fingers 86 slidably mounted in guide members 88 carried by the panel. The other ends of the latch fingers 86 are receivable in openings formed in latch brackets 90 carried by the side frame member 30.

The panel 38 when in closed position, as shown in Figures 1, 2 and 3 is supported along its lower edge on the main side frame member 30 with its upper edge lying beneath the upper hood overlap. When the panel 38 is in closed position, the finger portions 50 and 51 of the bar means 46 and the pin 76 of the lever 60 engage the lower ends of the slots 56, 58 and 78 as shown in Figures 2 and 3. Preparatory to raising the panel 38, the latch mechanism 80 is released by raising the handle 84 for actuating the cam means and pulling the latch fingers 86 out of engagement with the latch brackets 90. The lower part of the panel is then pulled outwardly and down until the upper part thereof is released from the overlap of the hood 34. Downward movement of the panel, from the position shown in Figures 1, 2 and 3, is facilitated by the slots 56, 58 and 78 which serve to permit the panel 38 to move relative to the finger portions 50 and 51 of the bar means 46 and the pin 76 of the lever 60. The finger portions 50 and 51 in the lowermost position of the panel engage the upper ends of the slots 56 and 58 for supporting the panel with the lower edge in a horizontal plane.

To raise the panel, only a slight upward force need be applied to it until, with the assistance of the counterbalance spring 74 acting through the lever 60 and pin 76 (which engages the upper end of the slot 78), it is moved to its full raised position shown in Figure 4. The spring 74 serves to releasably maintain the panel in a raised position. In full elevated position, the finger portion 51 of the bar means 46 is engaged by the lower end of the slot 58 and the bar means is thereby supported at its one end by the panel 38. At the same time, the finger portion 50 of the torsion bar engages the upper end of the slot 56 and the other end of the torsion bar thereby serves to support the side of the panel opposite the lever 60. In other words, the panel is supported at one side directly by the lever 60 and at the other side indirectly by the lever 60 acting through the medium of the torsion bar. As explained hereinbefore, the axis of the opening in the bracket 42 is arranged above the axis of the opening in the bracket 44 and the arm portion 48 of the bar means 46 is fabricated longer than the arm portion 49. The differential in effective lengths of the arms, which thus exists when the bar means extends upwardly, permits the finger portions to engage opposite ends of the slots 56 and 58 for insuring that the panel is supported with the lower edge in a horizontal plane. Moreover, it is to be observed that the panel when elevated is maintained substantially parallel to the vertical median plane of the vehicle. Consequently the vehicle may be operated with the panel open, as frontal visual interference is absent.

The side panel 38 is lowered by pulling down on the handle 84 until the panel is in its lowermost position. During this positioning operation of the panel, the upper end of the spring 74 moves "over-center" of the pivot pin 62 of the lever 60 and the spring thereupon serves to impose a closing force on the panel. At this point, the panel is raised until the upper edge thereof is moved under the overlap of the hood 34, and then pushed inwardly until the latch fingers 86 snap into the latch brackets 90 for securing the panel in closed position. The slots 56, 58 and 78 serve to permit vertical movement of the panel relative to the bar means 46 and the lever 60 to facilitate the positioning of the upper edge of the panel beneath the hood overlap.

In conclusion, then, it will be realized by those skilled in the art that I have provided hood linkage and latch mechanism which serves to facilitate the opening of a side hood panel without removal thereof from the vehicle. In addition, the mechanism serves to guide and steady the associated panel during movement thereof between its closed and open positions. And finally, the mechanism serves to maintain the open panel substantially parallel to the vertical median plane of the vehicle permitting the latter to be operated with the hood panel open.

Now, while I have shown and described what I believe to be a preferred embodiment of my present invention, it will be understood by those skilled in the art that various rearrangements and modifications may be made therein without departing from the spirit and scope of my invention.

I claim:

1. For use with a vehicle having a body with an opening in the side thereof, and a movable panel for enclosing the opening, the combination of spaced struts secured to the panel, spring biased means having connection between the vehicle body and the panel operable to impose an elevating force on the panel for elevating it to and maintaining it in an open position, said struts having first and second axially aligned vertical slots formed intermediate of the ends thereof, a bar means having a body portion extending generally to the panel and journaled in the vehicle body, the mounting of the one end of said body portion being offset downwardly from the mounting of the other end thereof, said bar means having generally L-shaped arm portions formed at the ends thereof in parallel planes substantially normal to the axis of the said body portion, the one arm portion adjacent the offset mounting being shorter than the other arm portion, out-turned finger portions formed at the ends of said arm portions with the axes of the finger portions being substantially normal to the axes of said arm portions, said finger portions being disposed respectively in the first and second slots in said struts, the upper ends of the first and second slots resting on said finger portions when the panel is in its lowermost position whereby the panel is supported with the lower edge thereof in a horizontal plane, the panel being elevated by urging the panel upwardly assisted by said spring biased means, and the finger portions of the short and long arm portions lying respectively at the lower and upper ends of the first and second slots when the panel is in full elevated position whereby the panel is supported with the lower edge thereof in a horizontal plane.

2. For use with a vehicle having a body with an opening in the side thereof, a body member overlapping the opening along the latter's upper edge, and a movable panel for enclosing the opening with the upper edge of the panel lying beneath the body member overlap, the combination of spaced struts secured to the panel, one of said struts having a first vertical slot formed in the lower end thereof, lever means pivotally mounted intermediate of its ends to the vehicle body and having a sliding connection at one end with the first slot of said strut, spring means having connection at its one end with said vehicle body and at its other end with the other end of said lever means, said spring means being operable to impose an elevating force on the panel for elevating it to and maintaining it in an open position, said struts having second and third axially aligned vertical slots formed intermediate of the ends thereof, a bar means having a body portion extending generally parallel to the panel and journaled in the vehicle body, the mounting of the one end of said body portion being offset downwardly from the mounting of the other end thereof, said bar means having generally L-shaped arm portions formed at the ends thereof in parallel planes substantially normal to the axis of the body portion, the one arm portion adjacent the offset mounting being shorter than the other arm portion, out-turned finger portions formed at the ends of said arm portions with the axes of the finger portions being substantially normal to the axes of the arm portions, said finger portions being disposed respectively in the second and third slots in said struts, said finger portions lying in the lower ends of said second and third slots when the upper edge of the panel lies beneath the overlap of the body member, said panel being conditioned for elevation to an open position by pulling the panel down and outwardly until the upper edge of the panel is released from the overlap of the body member at which time the upper ends of the second and third slots rest on said finger portions whereby the panel is supported with the lower edge thereof in a horizontal plane, the panel then being elevated by urging the panel upwardly assisted by said spring biased lever, and the finger portions of the short and long arm portions lying respectively at the lower and upper ends of the second and third slots when the panel is in full elevated position whereby the panel is supported with the lower edge thereof in a horizontal plane.

3. For use with a vehicle having a body with an opening in the side thereof, a body member overlapping the opening along the latter's upper edge, and a movable vertical panel for enclosing the opening with the upper edge of the panel lying beneath the body member overlap, the combination of spaced vertical struts secured to the panel, one of said struts having a first vertical slot formed in the lower end thereof, a lever pivotally mounted intermediate of its ends to the vehicle body on a horizontal axis, a horizontal pin member secured in one end of said lever and slidably mounted in the first slot of said strut, a spring connected at its one end to said vehicle body and at its other end to the other end of said lever, said spring being operable to impose an elevating force on the panel for elevating it to and maintaining it in an open position, said struts having second and third axially aligned vertical slots formed intermediate of the ends thereof, a bar means having a body portion extending generally parallel to the panel and journaled in the vehicle body, the mounting of the one end of said body portion being offset downwardly from the mounting of the other end thereof, said bar means having generally L-shaped arm portions formed at the ends thereof in parallel planes substantially normal to the axis of the body portion, the one arm portion adjacent the offset mounting being shorter than the other arm portion, out-turned finger portions formed at the ends of said arm portions with the axes of the finger portions being substantially normal to the axes of the arm portions, said finger portions being disposed respectively in the second and third slots in said struts, said finger portions lying in the lower ends of said second and third slots when the upper edge of the panel lies beneath the overlap of the body member, said panel being conditioned for elevation to an open position by pulling the panel down and outwardly until the upper edge of the panel is released from the overlap of the body member at which time the upper ends of the second and third slots rest on said finger portions whereby the panel is supported with the lower edge thereof in a horizontal plane, the panel then being elevated by urging the panel upwardly assisted by said spring biased lever, and the finger portions of the short and long arm portions lying respectively at the lower and upper ends of the second and third slots when the panel is in full elevated position whereby the panel is supported with the lower edge thereof in a horizontal plane.

4. For use with a vehicle having a body with an opening in the side thereof, a body member overlapping the opening along the latter's upper edge, and a movable vertical panel for enclosing the opening with the upper edge of the panel lying beneath the body member overlap, the combination of spaced vertical struts secured to the panel, one of said struts having a first vertical slot formed in the lower end thereof, a lever pivotally mounted intermediate of its ends to the vehicle body on a horizontal axis, a horizontal pin member secured in one end of said lever and slidably mounted in the first slot of said strut, a spring connected at its one end to said vehicle body and at its other end to the other end of said lever, said spring serving to impose an elevating force on the panel for elevating it to and maintaining it in an open position, the axis of said spring being arranged to pass through the plane of the axes of the pivotal mounting of said lever and the connection of said spring to the vehicle body when the panel is moved toward a closed position whereby said spring serves to impose a closing force on the panel, releasable latch means operable between the panel and the vehicle body for latching the panel in a closed position, said struts having second and third axially aligned vertical slots formed intermediate of the ends thereof, a bar means having a body portion extending generally parallel to the panel and journaled in the vehicle body, the mounting of the one end of said body portion being offset downwardly from the mounting of the other end thereof, said bar means having generally L-shaped arm portions formed at the ends thereof in parallel planes substantially normal to the axis of the body portion, the one arm portion adjacent the offset mounting being shorter than the other arm portion, out-turned finger portions formed at the ends of said arm portions with the axes of the finger portions being substantially normal to the axes of the arm portions, said finger portions being disposed respectively in the second and third slots in said struts, said finger portions lying in the lower ends of said second and third slots when the upper edge of the panel lies beneath the overlap of the body member, said panel being conditioned for elevation to an open position by first releasing the latch means and pulling the panel down and outwardly until the upper edge of the panel is released from the overlap of the body member at which time the upper ends of the second and third slots rest on said finger portions whereby the panel is supported with the lower edge thereof in a horizontal plane, the panel then being elevated by urging the panel upwardly assisted by said spring biased lever, and the finger portions of the short and long arm portions lying respectively at the lower and upper ends of the second and third slots when the panel is in full elevated position whereby the panel is supported with the lower edge thereof in a horizontal plane.

5. For use with a vehicle having a body with an opening in the side thereof and a movable panel for enclosing the opening, the combination of spring biased means having connection between the vehicle body and the panel and operable to impose pulling force on the panel for elevating it to and maintaining it in an open position, bar means having a body portion extending generally parallel to the panel, such being pivoted on the vehicle body for turning movement and otherwise being restrained against movement relative to said vehicle body, arm portions formed at the opposite ends of said bar means, free ends of said arm portions being turned outwardly therefrom, strut means on said panel having slotted openings for receiving said free ends whereby the same have limited sliding connection with the panel, the arm portions being effective to facilitate support of the panel in its lowered and elevated positions so that the longitudinal axis of said panel is maintained substantially horizontal thereat, and the panel being elevated by urging the same upwardly assisted by said spring biased means.

6. For use with a vehicle having a body with an opening in the side thereof and a movable panel for enclosing such opening, the combination of means for maintaining the panel parallel to a vertical median plane of the vehicle when the panel is in its open position comprising, lever means pivotally mounted intermediate its ends to the vehicle body on a horizontal axis and having connection at one end with the panel, spring means connected at one end to said vehicle body and at its other end to said lever means, said spring means serving to impose elevating force on the panel for raising the same to and maintaining such in an open position, the axis of said spring means being arranged to pass through the plane of the axes of the pivotal mounting of the lever and the connection of the spring to the vehicle body when the panel is moved toward a closed position whereby said spring means also serves to impose a closing force on the panel, bar means having a body portion extending generally parallel to the panel and pivoted on the vehicle body for turning movement and being otherwise restrained against movement relative to said vehicle body, extending arm portions formed at the ends of said bar means, free ends of said arm portions turned outwardly therefrom, means extending outwardly of the plane of said panel adjacent the opposite ends thereof and presenting coaxially aligned openings receptive of the free ends of said arm portions, said openings effecting limited sliding connection between the panel and said arm portions, the arm portions facilitating support of the panel parallel to the vertical median plane of the vehicle when the panel is in its elevated position, the panel means being elevated by urging the same upwardly assisted by the spring biased lever means.

References Cited in the file of this patent
UNITED STATES PATENTS

| | | |
|---|---|---|
| 1,617,661 | Abell | Feb. 15, 1927 |
| 1,892,491 | Mastrangelo et al. | Dec. 27, 1932 |
| 1,914,559 | Dath | June 20, 1933 |
| 2,200,542 | D'Alfonso | May 14, 1940 |
| 2,327,026 | Deuring | Aug. 17, 1943 |
| 2,480,965 | Remke et al. | Sept. 6, 1949 |